(12) United States Patent
Storm et al.

(10) Patent No.: US 8,379,422 B2
(45) Date of Patent: Feb. 19, 2013

(54) CIRCUIT ARRANGEMENT COMPRISING A VOLTAGE TRANSFORMER AND ASSOCIATED METHOD

(75) Inventors: Arwed Storm, Dachau (DE); Siegfried Mayer, Moosinning (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 264 days.

(21) Appl. No.: 12/669,052

(22) PCT Filed: Jul. 18, 2007

(86) PCT No.: PCT/EP2007/057412
§ 371 (c)(1),
(2), (4) Date: Jan. 14, 2010

(87) PCT Pub. No.: WO2009/010098
PCT Pub. Date: Jan. 22, 2009

(65) Prior Publication Data
US 2010/0202173 A1  Aug. 12, 2010

(51) Int. Cl.
*H02M 5/42* (2006.01)
(52) U.S. Cl. ............... 363/86; 363/34; 363/60
(58) Field of Classification Search ............ 323/37, 323/43, 78, 97, 131, 140; 363/37, 43, 78, 363/97, 131, 140, 59, 60, 85, 86; 327/536
See application file for complete search history.

(56) References Cited

U.S. PATENT DOCUMENTS

| | | | |
|---|---|---|---|
| 6,465,991 B1 | 10/2002 | Chang | |
| 7,307,387 B2 | 12/2007 | Storm | |
| 2005/0128467 A1* | 6/2005 | Komaki | 356/73.1 |
| 2005/0152163 A1* | 7/2005 | Heckmann et al. | 363/37 |
| 2006/0226817 A1* | 10/2006 | Storm | 323/225 |

FOREIGN PATENT DOCUMENTS

| | | |
|---|---|---|
| EP | 1710898 A2 | 10/2006 |
| WO | 0147324 A1 | 6/2001 |
| WO | 0241480 A2 | 5/2002 |

OTHER PUBLICATIONS

Busse et al.: "SEPIC converter to perform power factor correction in a ballast for fluorescent lamps", Industry Applications Conference, 2005. Fourtieth IAS Annual Meeting. Conference Record of the 2005 Hong Kong, China Oct. 2-6, 2005, Piscataway, NJ, USA, IEEE, vol. 4, Oct. 2, 2005, pp. 2770-2774.
International Search Report dated Jun. 9, 2008.

* cited by examiner

*Primary Examiner* — Gary L Laxton
*Assistant Examiner* — Gustavo Rosario Benitez

(57) ABSTRACT

A method for operating a circuit arrangement is provided. The method may include coupling a second connection of a control device to a connection that provides an alternating signal during operation of the circuit arrangement; in the control device: generating a trigger signal for the control electrode of the mode switch that is correlated with the sum signal from the signal at the connection for providing an alternating signal and the control signal; and providing the trigger signal at the output of the control device.

11 Claims, 1 Drawing Sheet

CIRCUIT ARRANGEMENT COMPRISING A VOLTAGE TRANSFORMER AND ASSOCIATED METHOD

RELATED APPLICATIONS

Figure 1:
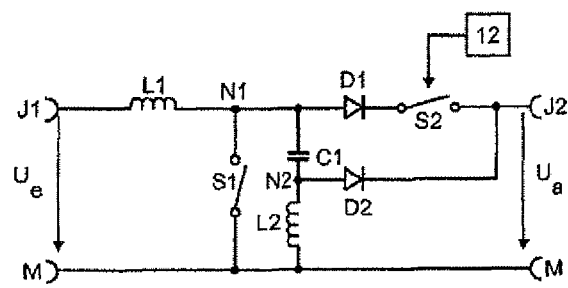

The present application is a national stage entry according to 35 U.S.C. §371 of PCT application No.: PCT/EP2007/057412 filed on Jul. 18, 2007.

TECHNICAL FIELD

The present invention relates to a circuit arrangement having a voltage converter, the voltage converter including the following: an input terminal, an output terminal, a connection for providing a reference potential, a series connection of a first inductor and an electronic switch, which is coupled between the input terminal and the connection in order to provide the reference potential, a first node being formed between the first inductor and the electronic switch, a series connection of a first capacitor and a second inductor, which is connected in parallel with the electronic switch, a second node being formed between the first capacitor and the second inductor, a series connection of a first diode and a mode switch, which is coupled between the first node and the output terminal, the first diode being polarized in such a way that it permits a current flow from the first node to the output terminal, the mode switch having a working electrode, a reference electrode and a control electrode, the reference electrode of the mode switch being coupled to the output terminal, and the working electrode of the mode switch being coupled to the first diode, a second diode, whose anode is coupled to the second node, and whose cathode is coupled to the output terminal, and a control device with an output that is coupled to the control electrode of the mode switch, the control device having a first connection for feeding a control signal, the circuit arrangement further including a connection that is designed to provide an alternating signal during operation of the circuit arrangement. Furthermore, it relates to a method for operating such a circuit arrangement.

BACKGROUND

The topologies of a boost converter and a SEPIC (Single Ended Primary Inductance Converter) are generally known in pulsed power supplies. Particularly in the case of two-stage operating devices for discharge lamps, these converter types are widespread in the first stage. The first stage effects a power factor correction and provides an intermediate circuit voltage while, as a rule, a second stage generates a high frequency AC voltage for feeding the discharge lamp. The pulse in the two pulsed power supplies is effected by electronic switches that switch at high frequency compared with a line frequency.

WO 02/41480 discusses the respective advantages and disadvantages of the two converter types that are used in the first stage for the purpose of power factor correction. The essential advantage of the boost converter consists accordingly in a high efficiency, while bounding the lower limit of the output voltage to the peak value of the input voltage is a disadvantage. The characteristics of the SEPIC are the opposite: its output voltage may advantageously be selected independently of the input voltage, while its efficiency is substantially lower than in the case of the boost converter.

WO 02/41480 describes a voltage converter whose topology can be switched over. Depending on the position of a changeover switch, the disclosed voltage converter operates either as a boost converter in a boost mode, or as a SEPIC in a SEPIC mode. The voltage converter disclosed in WO 02/41480 has the following disadvantages: a changeover switch with three poles is required to switch over between the topologies. Although this can be implemented using mechanical switches, an implementation with semiconductor switches is complicated, since two switches are required. In addition, these two switches need to be synchronized. A further disadvantage lies in the fact that an inductor that is required for the SEPIC is switched off in the boost mode. The redundant SEPIC inductor has no function in the boost mode. This has the result that the inductor, which is active both in the SEPIC mode and in the boost mode, is subjected to different loads in the two modes with the same power output at the output of the voltage converter. This inductor needs to be dimensioned such that the maximum amount of energy that can be stored by this inductor in the boost mode is not exceeded. In this case of the SEPIC mode, this inductor is then over-dimensioned. This results in the switchable voltage converter being more expensive than the unswitchable converter in whose mode it is presently operating.

The last-mentioned problems are disposed of by a voltage converter that is known from EP 1 710 898 and is illustrated in FIG. 1. A series connection of a first inductor L1 and an electronic switch S1 is connected between an input terminal J1 and a reference potential M, a first node N1 being formed at the tie point. The voltage converter can be fed between the input terminal J1 and the reference potential M by an energy source whose input terminal J1 generates an input voltage $U_e$. If appropriate, a filter for reducing radio interference or counteracting overvoltage can further be connected there between.

A series connection of a first capacitor C1 and a second inductor L2 is connected in parallel with the electronic switch S1, a second node N2 being formed at the tie point of the first capacitor C1 and second inductor L2. In addition, a ripple current compensation can be implemented by a magnetic coupling of the inductors L1 and L2.

A series connection of a first diode D1 and a mode switch S2 is connected between the first node N1 and an output terminal J2, the first diode D1 being polarized such that it permits a current flow from the first node N1 to the output terminal J2. An output voltage $U_a$ is present between J2 and the reference potential M. In general, it is buffered by a storage capacitor from which a load, in particular a discharge lamp, draws energy. The so-called intermediate circuit voltage is then present across the storage capacitor. An inverter connected downstream of the voltage converter can generate from the intermediate circuit voltage a high frequency AC voltage that serves to operate a discharge lamp.

With a closed mode switch S2, the voltage converter operates as a boost converter. This is advantageous when a higher voltage is required at J2 than is present at J1.

A second diode D2 is connected with its anode to the second node N2, and with its cathode to the output terminal J2. The voltage converter can therefore operate as a SEPIC when S2 is opened. This is advantageous when a lower voltage is required at J2 than is present at J1. In this case, the control of the mode switch S2 can be performed by a control device 12. The effect of the control device 12 is that the mode switch S2 is open if the voltage at the input terminal J1 exceeds a defined voltage limiting value.

During operation of discharge lamps, the mode switch S2 can also be controlled independently of the voltage that is required by a lamp to be operated at the output J2. If a lamp requires a voltage that is high by comparison with the voltage at the input terminal J1, the mode switch S2 is closed and the voltage converter operates in the boost mode. At comparatively low voltages, the mode switch S2 is opened and the voltage converter operates in the SEPIC mode.

Figure 2:
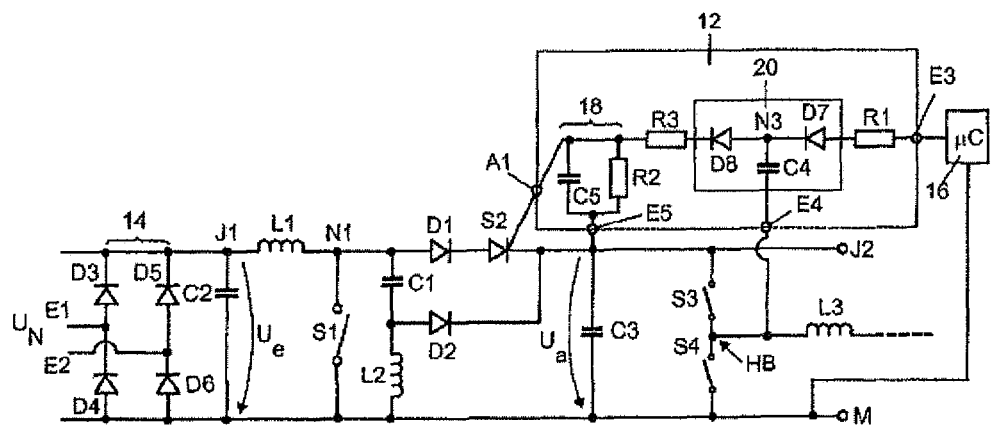

FIG. 2 of EP 1 710 898 shows an exemplary embodiment of a control device 12 of a mode switch S2. A disadvantage of the control device presented there is to be seen, in particular, in the necessity in this case of a high voltage switch, denoted there by S22, for transmitting the control signal, since its reference electrode is coupled to the frame potential, its control electrode to the control signal, but its working electrode is coupled to the intermediate circuit voltage. This results in production costs that are undesirably high.

SUMMARY

Various embodiments develop the circuit arrangement named at the beginning in such a way that it can be implemented without high voltage switches. Furthermore, various embodiments provide an appropriate method for operating such a circuit arrangement.

These objects are achieved by a circuit arrangement having the features of a circuit arrangement comprising a voltage converter, the voltage converter comprising: an input terminal; an output terminal; a connection for providing a reference potential; a series connection of a first inductor and an electronic switch, which is coupled between the input terminal and the connection in order to provide the reference potential, a first node being formed between the first inductor and the electronic switch; a series connection of a first capacitor and a second inductor, which is connected in parallel with the electronic switch, a second node being formed between the first capacitor and the second inductor; a series connection of a first diode and a mode switch, which is coupled between the first node and the output terminal, the first diode being polarized in such a way that it permits a current flow from the first node to the output terminal, the mode switch comprising a working electrode, a reference electrode and a control electrode, the reference electrode of the mode switch being coupled to the output terminal, and the working electrode of the mode switch being coupled to the first diode; a second diode, whose anode is coupled to the second node, and whose cathode is coupled to the output terminal; and a control device with an output that is coupled to the control electrode of the mode switch, the control device having a first connection for feeding a control signal the circuit arrangement further comprising a connection that is designed to provide an alternating signal during operation of the circuit arrangement; wherein the control device further comprises a second connection which is coupled to the connection that provides an alternating signal during operation of the circuit arrangement; the control device being configured to provide at its output a trigger signal that is intended for the control electrode of the mode switch and is correlated with the sum of the signal being provided at the terminal for providing an alternating signal during operation of the circuit arrangement, and of the control signal, and by a method for operating a circuit arrangement comprising a voltage converter, the voltage converter comprising: an input terminal. an output terminal, a connection for providing a reference potential, a series connection of a first inductor and of an electronic switch, which is coupled between the input terminal and the connection in order to provide the reference potential, a first node being formed between the first inductor and the electronic switch, and also a series connection of a first capacitor and a second inductor, which is connected in parallel with the electronic switch, a second node being formed between the first capacitor and the second inductor, as well as a series connection of a first diode and a mode switch, which is coupled between the first node and the output terminal, the first diode being polarized in such a way that it permits a current flow from the first node to the output terminal, the mode switch comprising a working electrode, a reference electrode and a control electrode, the reference electrode of the mode switch being coupled to the output terminal, and the working electrode of the mode switch being coupled to the first diode, and a second diode, whose anode is coupled to the second node, and whose cathode is coupled to the output terminal, and a control device with an output that is coupled to the control electrode of the mode switch, the control device having a first connection for feeding a control signal, the circuit arrangement further comprising a connection that is designed to provide an alternating signal during operation of the circuit arrangement; the method comprising: coupling a second connection of the control device to the connection that provides an alternating signal during operation of the circuit arrangement; in the control device: generating a trigger signal for the control electrode of the mode switch that is correlated with the sum signal from the signal at the connection for providing an alternating signal and the control signal; and providing the trigger signal at the output of the control device. Various embodiments are based on the finding that these effects can be achieved when the level of the voltages present at the electrodes of the mode switch is brought to the level of the output terminal, that is to say the high voltage level of the so-called intermediate circuit voltage, since this provides the possibility of initiating a switching operation by the low voltage level of the control signal. Various embodiments offer the advantage of providing a circuit arrangement that enables a voltage converter to be switched to and fro between a boost mode and a SEPIC mode without any need for a high voltage switch to this end. A switchover operation between boost and SEPIC modes can therefore be initiated directly with the low voltage output signal of a digital microcontroller. It may be provided that the connection for providing an alternating signal is designed to provide, during operation of the circuit arrangement, an alternating signal whose level oscillates between the reference potential and the level at the output terminal. It is thereby possible to avoid adapting the level. Any desired alternating signal is sufficient in principle for various embodiments, although, as mentioned, it is necessary to provide adaptation of the level depending on the level of the alternating signal.

It is particularly preferred for the alternating signal to be a rectangular signal.

In a preferred embodiment, the circuit arrangement further includes an inverter with at least one series connection of a first inverter switch and a second inverter switch that is coupled between the output terminal and the connection for the reference potential, a third node, in particular a bridge center point, being formed between the first inverter switch and second inverter switch, the connection for providing the alternating signal being coupled to the third node, in particular corresponding to the latter. In other words, the potential at the bridge center point, which oscillates to and fro in a substantially rectangular fashion between the reference potential and the potential of the output terminal, is used in order to provide the sum signal for the mode switch as trigger signal therefrom together with the control signal.

It is preferred, furthermore, when the circuit arrangement further includes a rectifier that provides a DC supply voltage at its output, the first node and the output terminal being coupled to the output of the rectifier.

In a particularly preferred embodiment, the control device includes a charge pump that has an input that is coupled to the second connection of the control device. The charge pump preferably includes a further input that is coupled to the first connection of the control device. Finally, it is preferred when the charge pump has an output and is configured to provide at its output a signal that is correlated with the sum of the signals coupled to its two inputs, a timer being coupled between the output of the charge pump and the output of the control device. A charge pump provides a particularly expedient possibility of adding two voltages that are not floating. It therefore permits the avoidance of devices for displacing the voltage level, which would result in an undesirable complication.

The time constant of the timer preferably corresponds to a multiple of the reciprocal of the frequency of the signal with which the inverter switches are triggered. The result of this is that the trigger signal for the control electrode of the mode switch, which is composed of the alternating signal and the control signal, is present, as it were, as a direct voltage signal whose level differs by that of the control signal from the level at the reference electrode of the mode switch. Consequently, only the slight control signal is present between the control and working electrodes of the mode switch, and permits a switching operation to be initiated.

The time constant of the timer is preferably designed in particular to provide a pulse at the output of the control device as trigger signal for the control electrode of the mode switch that is suitable for triggering the mode switch. Particularly when the mode switch is implemented by a thyristor, inadvertent ignition is thereby avoided by high dU/dt values, since the control electrode of the thyristor is blocked by the timer against its cathode. Such dimensioning takes account of the circumstance that a specific quantity of energy is required in order to initiate a switching operation of the mode switch.

As mentioned, the mode switch is preferably a thyristor or a bipolar transistor or a MOSFET. Particular preference is given to an implementation by means of a thyristor, since the latter requires only a low trigger voltage and a low trigger current, and thus a low trigger power. Furthermore, it offers low losses in the case of high HF current amplitudes, blocks even for high dU/dt in the event of the absence of a control signal, and therefore serves the purpose of limiting the starting current. Moreover, it enables a particularly cost effective implementation of an inventive circuit arrangement.

Further advantageous embodiments are found in the subclaims.

To the extent that they can be applied, the preferred embodiments presented with reference to the inventive circuit arrangement, and the advantages thereof, are likewise valid for the inventive method.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a schematic of a circuit arrangement, known from the prior art, having a voltage converter that can be switched over between a boost mode and a SEPIC mode; and FIG. 2 shows a schematic of an inventive circuit arrangement having a switchable voltage converter.

DETAILED DISCRIPTION

The following detailed description refers to the accompanying drawings that show, by way of illustration, specific details and embodiments in which the invention may be practiced.

FIG. 2 is a schematic of an exemplary embodiment of an inventive circuit arrangement having a switchable voltage converter. It has a rectifier 14 that includes the diodes D3, D4, D5 and D6, it being possible to apply an AC supply voltage $U_N$ at the rectifier input E1, E2. The voltage $U_e$ provided at the output of the rectifier 14 between an input terminal J1 of the voltage converter and the frame potential M is supported by means of a capacitor C2. Following thereupon is the series connection of a first inductor L1 and an electronic switch S1, a first node N1 being formed between the first inductor L1 and the electronic switch S1. The series connection of a capacitor C1 and a second inductor L2 is connected in parallel with the electronic switch S1, a second node N2 being formed between the capacitor C1 and the second inductor L2. Following thereupon is the series connection of a first diode and a mode switch S2, which connection is coupled between the first node N1 and the output terminal J2. Here, the diode D1 is polarized in such a way that it permits a flow of current from the first node N1 to the output terminal J2. The mode switch S2 has a working electrode, a reference electrode and a control electrode, the reference electrode of the mode switch S2 being coupled to the output terminal J2, and the working electrode of the mode switch S2 being coupled to the first diode D1. A second diode D2 has an anode that is coupled to the second node N2, and a cathode that is coupled to the output terminal J2.

Moreover, the inventive circuit arrangement has a control device 12 having an output A1 that is coupled to the control electrode of the mode switch S2; furthermore, it has an input E3 that is coupled to a microcontroller 16 for the purpose of feeding a control signal. The control device 12 has an input E4 that is coupled to the center point HB of a half bridge inverter. The latter includes the series connection of two electronic switches S3 and S4, this series connection being fed from the voltage $U_a$ present at the output terminal J2. This voltage $U_a$ is, however, supported by a capacitor C3.

The half bridge center point is coupled via a lamp inductor L3 to a discharge lamp (not illustrated). The control device 12 includes a charge pump 20 that has a diode D7, a diode D8 and a capacitor C4. Via an ohmic resistor R1 and the diode D7, the input E3 is coupled to a node N3 that is coupled, on the other hand, to the input E4 of the control device 12 via the capacitor C4. The node N3 of the control device 12 is coupled to the output A1 of the control device 12 via the diode D8 and an ohmic resistor R3. Coupled in parallel with the path between the control electrode and reference electrode of the mode switch S2 is a timer 18 that presently includes a capacitor C5 and an ohmic resistor R2. The potential of the output terminal J2 is fed to the control device 12 via an input E5.

The resistors R1 and R3 serve to limit the charging currents.

To function: The charge pump 20 provided in the control device 12 enables a floating addition of the signal provided at the input E3 by a microcontroller 16, and the potential which is present at the half bridge center point HB and is provided to the control device 12 via the input E4. Because of the timer 18, a quasi-direct signal is provided at the output A1, its level being increased by the potential of the control signal by contrast with the level at the reference electrode of the mode switch S2, which corresponds to the potential of the output terminal J2.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit arrangement comprising a voltage converter, the voltage converter comprising:
    an input terminal;
    an output terminal;
    a reference connection for providing a reference potential;
    a first series connection of a first inductor and an electronic switch, which is coupled between the input terminal and the reference connection in order to provide the reference potential, a first node being formed between the first inductor and the electronic switch;
    a second series connection of a first capacitor and a second inductor, which is connected in parallel with the electronic switch, a second node being formed between the first capacitor and the second inductor;
    a third series connection of a first diode and a mode switch, which is coupled between the first node and the output terminal, the first diode being polarized in such a way that it permits a current flow from the first node to the output terminal, the mode switch comprising a working electrode, a reference electrode and a control electrode, the reference electrode of the mode switch being coupled to the output terminal, and the working electrode of the mode switch being coupled to the first diode;
    a second diode, whose anode is coupled to the second node, and whose cathode is coupled to the output terminal; and
    a control device with a control device output that is coupled to the control electrode of the mode switch, the control device having a first input connection for feeding a control signal;
    the circuit arrangement further comprising an alternating signal terminal that is designed to provide an alternating signal during operation of the circuit arrangement;
    wherein the control device further comprises a second input connection which is coupled to the alternating signal terminal that provides the alternating signal during operation of the circuit arrangement; the control device being configured to provide at the control device output a trigger signal that is intended for the control electrode of the mode switch and is correlated with the sum of the alternating signal being provided at the alternating signal terminal and of the control signal;
    wherein the control device comprises a charge pump that has a second charge pump input that is coupled to the second input connection of the control device;
    wherein the charge pump has a first charge pump input that is coupled to the first input connection of the control device; and
    wherein the charge pump has a charge pump output and is configured to provide at the charge pump output a charge pump output signal that is correlated with the sum of a derivative control signal based on the control signal and a derivative alternating signal based on the alternating signal, the derivative control signal being provided to the first charge pump input and the derivative alternating signal being provided to the second charge pump input, and a timer being coupled between the charge pump output and the control device output.

2. The circuit arrangement as claimed in claim 1, wherein the alternating signal terminal is designed to provide, during operation of the circuit arrangement, the alternating signal whose level oscillates between the reference potential and the level at the output terminal.

3. The circuit arrangement as claimed in claim 2, wherein the alternating signal is a rectangular signal.

4. The circuit arrangement as claimed in claim 1, wherein the circuit arrangement comprises an inverter with at least one fourth series connection of a first inverter switch and a second inverter switch that is coupled between the output terminal and the reference connection for the reference potential, a third node being formed between the first inverter switch and the second inverter switch, the alternating signal terminal being coupled to the third node.

5. The circuit arrangement as claimed in claim 1, wherein the circuit arrangement further comprises a rectifier that provides a DC supply voltage at a rectifier output terminal, the first node and the reference connection for providing the reference potential being coupled to the rectifier output terminal.

6. The circuit arrangement as claimed in claim 1, wherein a time constant of the timer corresponds to a multiple of the reciprocal of the frequency of a signal with which the inverter switches are triggered.

7. The circuit arrangement as claimed in claim 1, wherein a time constant of the timer is designed to provide a pulse at the control device output as the trigger signal for the control electrode of the mode switch that is suitable for triggering the mode switch.

8. The circuit arrangement as claimed in claim 1, wherein the mode switch is selected from a group consisting of a thyristor or a bipolar transistor or a MOSFET.

9. A method for operating a circuit arrangement comprising a voltage converter, the voltage converter comprising:
    an input terminal,
    an output terminal,
    a reference connection for providing a reference potential,
    a first series connection of a first inductor and of an electronic switch, which is coupled between the input terminal and the reference connection in order to provide the reference potential,
    a first node being formed between the first inductor and the electronic switch, and also a second series connection of a first capacitor and a second inductor, which is connected in parallel with the electronic switch,
    a second node being formed between the first capacitor and the second inductor, and a third series connection of a first diode and a mode switch, which is coupled between the first node and the output terminal, the first diode being polarized in such a way that it permits a current flow from the first node to the output terminal,
    the mode switch comprising a working electrode, a reference electrode and a control electrode, the reference electrode of the mode switch being coupled to the output terminal, and the working electrode of the mode switch being coupled to the first diode, and a second diode, whose anode is coupled to the second node, and whose cathode is coupled to the output terminal, and a control device with a control device output that is coupled to the control electrode of the mode switch, the control device having a first input connection for feeding a control signal, the circuit arrangement further comprising an alternating signal terminal that is designed to provide an alternating signal during operation of the circuit arrangement;
    the method comprising:
    coupling a second input connection of the control device to the alternating signal terminal;
    in the control device: generating a trigger signal for the control electrode of the mode switch that is correlated with the sum signal from the alternating signal at the alternating signal terminal and the control signal; and providing the trigger signal at the control device output of the control device, wherein the control device comprises a charge pump that has a second charge pump input that is coupled to the second input connection of the control device;

wherein the charge pump has a first charge pump input that is coupled to the first input connection of the control device; and wherein the charge pump has a charge pump output and is configured to provide at the charge pump output a charge pump output signal that is correlated with the sum of a derivative control signal based on the control signal and a derivative alternating signal based on the alternating signal, the derivative control signal provided being provided to the first charge pump input and the derivative alternating signal being provided to the second charge pump input, and a timer being coupled between the charge pump output and the control device output.

10. The circuit arrangement as claimed in claim 4, wherein the third node is a bridge center point.

11. The circuit arrangement as claimed in claim 4, wherein the connection for providing the alternating signal corresponds to the third node.

* * * * *